United States Patent [19]

Miller et al.

[11] Patent Number: 4,847,718
[45] Date of Patent: Jul. 11, 1989

[54] CASSETTE WITH ERASING MEANS

[75] Inventors: Roger L. Miller, LaGrange, Ind.; Matthew D. Miklovic, Whitehouse, Ohio

[73] Assignee: NFO Research, Inc., Toledo, Ohio

[21] Appl. No.: 131,621

[22] Filed: Dec. 11, 1987

[51] Int. Cl.$^4$ ............... G11B 5/024; G11B 5/325; G11B 23/08
[52] U.S. Cl. ............................. 360/132; 360/118
[58] Field of Search ..................... 360/132, 118, 66

[56] References Cited

U.S. PATENT DOCUMENTS

| | | | |
|---|---|---|---|
| 3,612,774 | 10/1971 | Wiklund | 360/132 |
| 4,017,905 | 4/1977 | Covertine et al. | 360/96 |
| 4,466,584 | 8/1984 | Chevalier et al. | 360/132 |
| 4,482,104 | 11/1984 | Saito | 360/132 |
| 4,656,548 | 4/1987 | Pfefferkorn et al. | 360/132 |
| 4,660,115 | 4/1987 | Westfall et al. | 360/132 |
| 4,660,116 | 4/1987 | Westfall et al. | 360/132 |
| 4,763,218 | 8/1988 | Westfall et al. | 360/132 |

FOREIGN PATENT DOCUMENTS

| | | |
|---|---|---|
| 52-9404 | 1/1977 | Japan . |
| 58-125277 | 7/1983 | Japan . |
| 8401657 | 4/1984 | PCT Int'l Appl. . |
| 2119753 | 11/1983 | United Kingdom . |

Primary Examiner—Robert S. Tupper
Attorney, Agent, or Firm—Emch, Schaffer, Schaub & Porcello Co.

[57] ABSTRACT

A cassette having improved erasing means is disclosed. The cassette has a top and a base which define a front wall. The front wall defines an opening through which the tape passes on its way to a take-up reel mounted in the base. A magnet which is aligned in a horizontal orientation is mounted adjacent the opening. As the tape passes the magnet, the signals on the tape are erased. The magnet is moved out of its erase position to allow redubbing of the tape.

6 Claims, 4 Drawing Sheets

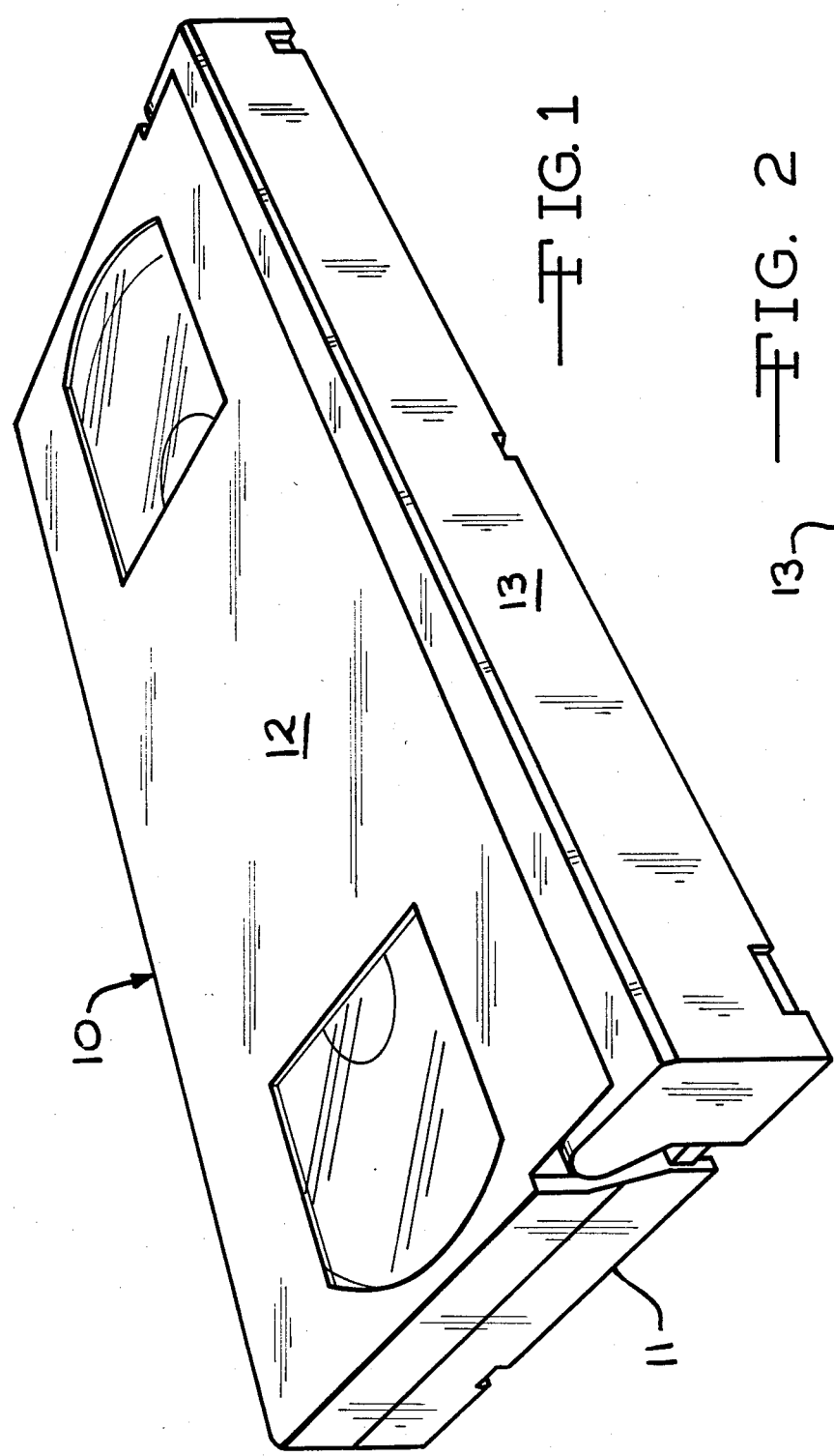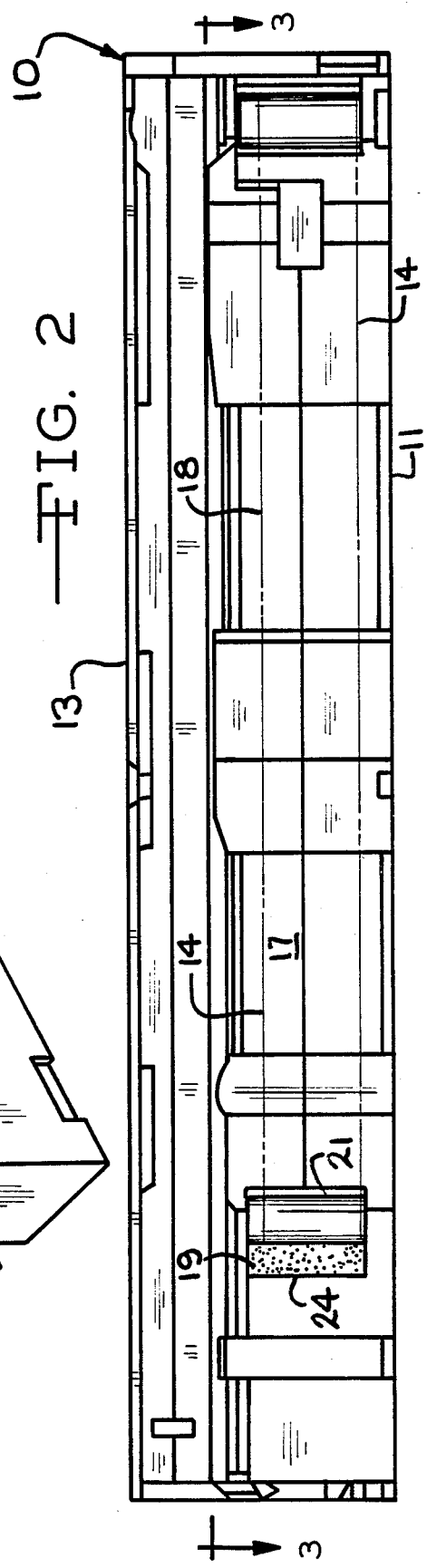

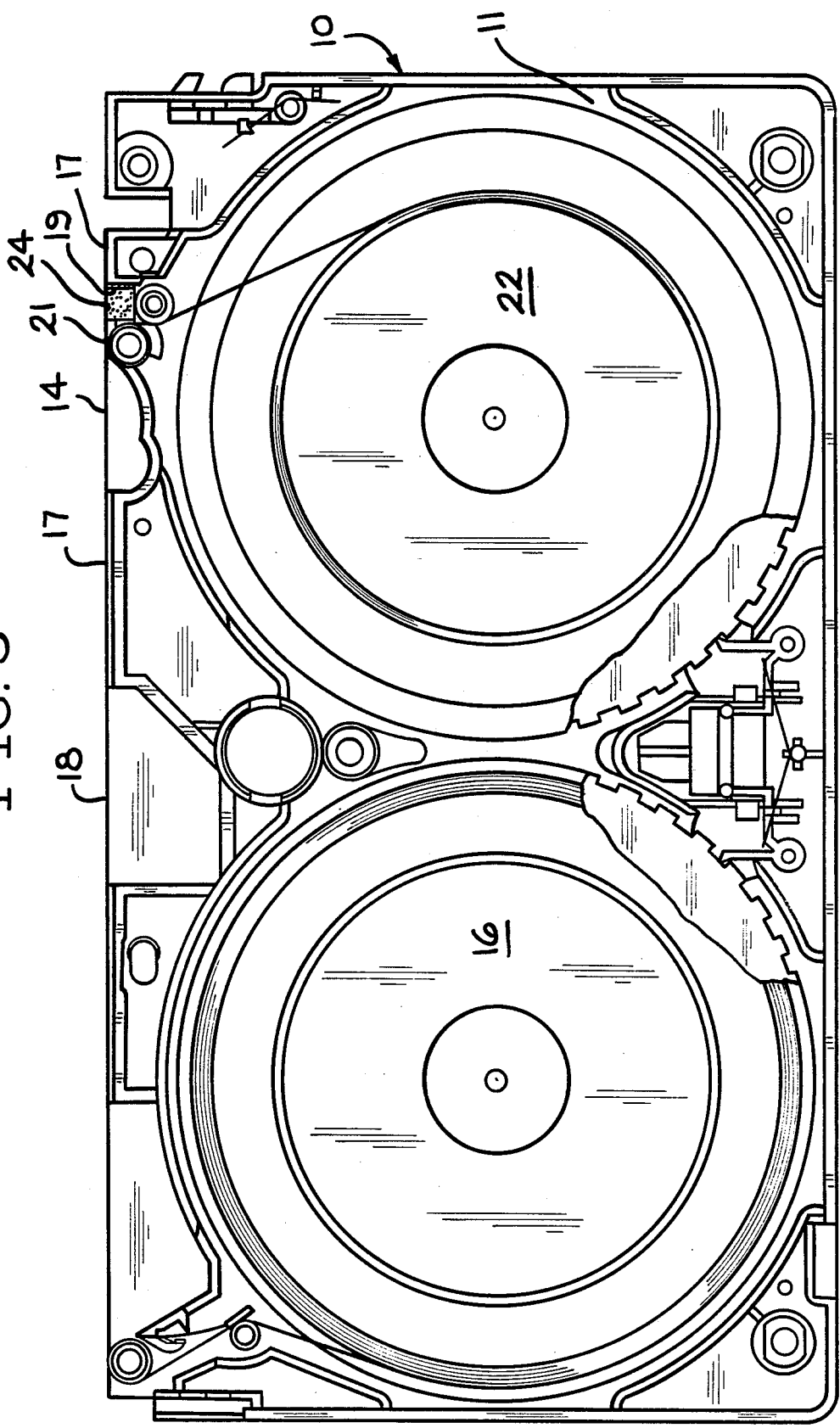

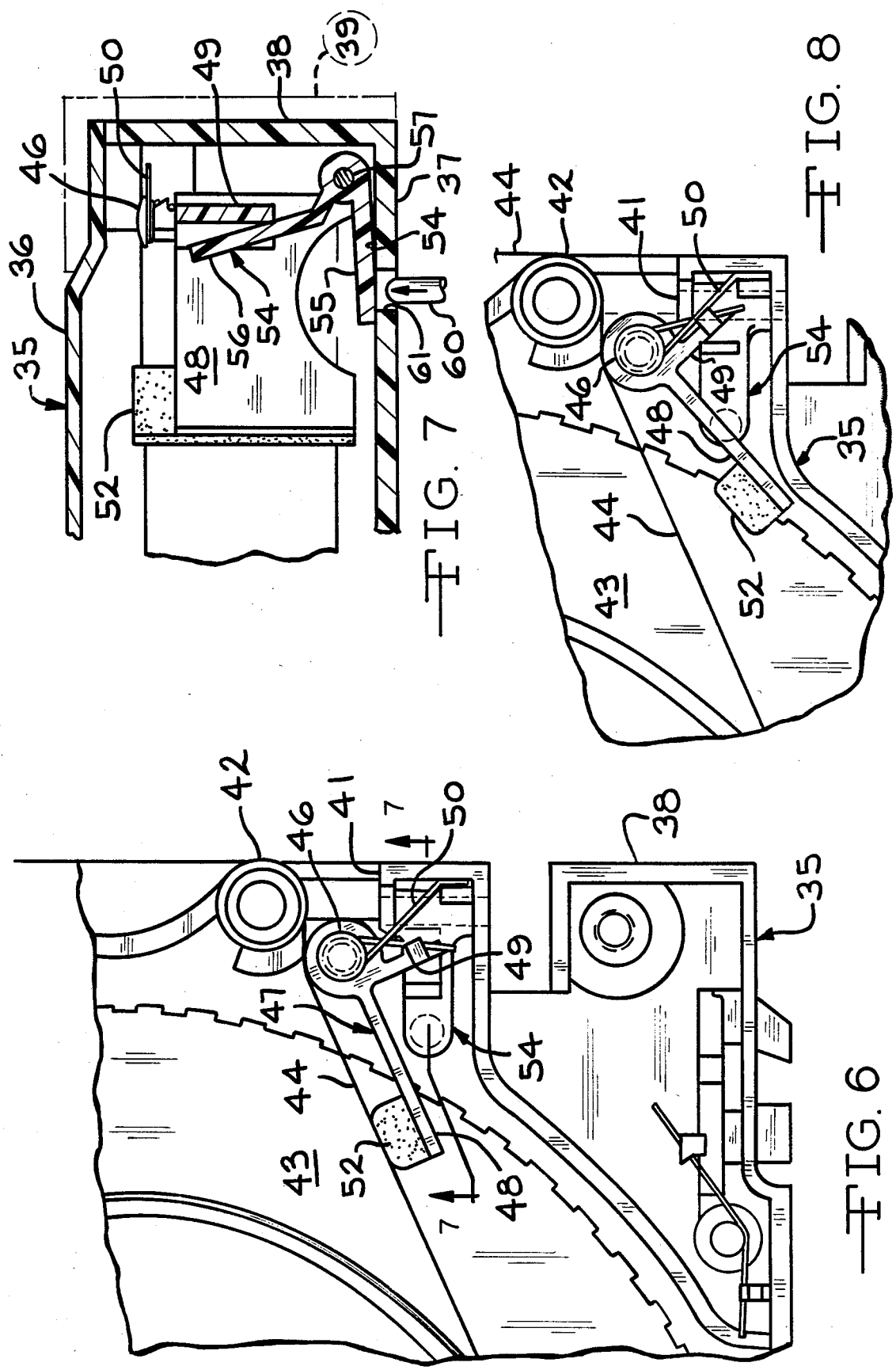

CASSETTE WITH ERASING MEANS

BACKGROUND OF THE INVENTION

The present invention is directed to a video tape cartridge and more specifically to an improved video cassette with erasing means. Video cassettes with erasing means are known in the prior art and are shown, for example, in Japanese Application No. 6056/1982 bearing Publication No. 58-125277 dated July 26, 1983. The Japanese publication discloses the broad concept of placing a magnet within a cassette to erase recorded information immediately after playing the tape.

SUMMARY OF THE INVENTION

The present invention is directed to an improved cassette with an erasing means in which a magnet is positioned adjacent the front wall of the cartridge and the magnet is aligned in a horizontal orientation. By placing the magnet adjacent the front wall of the cassette housing, and by aligning the magnet in a horizontal orientation, a video tape after passing the player head is efficiently erased as it travels its path to the take-up reel. However, the magnet may be moved to allow redubbing of the tape so that the cassette may be used again without disassembly of such cassette.

The video cassette housing has a base, a top and an pivoting door adjacent the top. A supply reel and a take-up reel are mounted for movement on the base. The video tape extends from the supply reel along a path to the take-up reel, including a path portion which extends along the front edge of the base and top adjacent the door. The base and top define a front wall adjacent the path portion. The front wall has an opening for receiving the tape as it passes from the path portion to the take-up reel and a magnet is mounted adjacent the opening. The magnet is aligned in the horizontal orientation.

DESCRIPTION OF THE DRAWINGS

FIG. 1 is a perspective view of a video cassette, according to the present invention;

FIG. 2 is an enlarged elevational view of the cassette shown in FIG. 1 and having the door pivoted upwardly;

FIG. 3 is a sectional view taken along the lines 3—3 of FIG. 2;

FIG. 6 is a fragmentary elevational view of still another embodiment of a cassette, according to the present invention;

FIG. 7 is a fragmentary, sectional view taken along the line 7—7 of FIG. 6; and

FIG. 8 is a fragmentary perspective view similar to FIG. 6 and showing the magnet moved away from the tape to a redubbing position.

DESCRIPTION OF THE PREFERRED EMBODIMENTS

Figure 4:
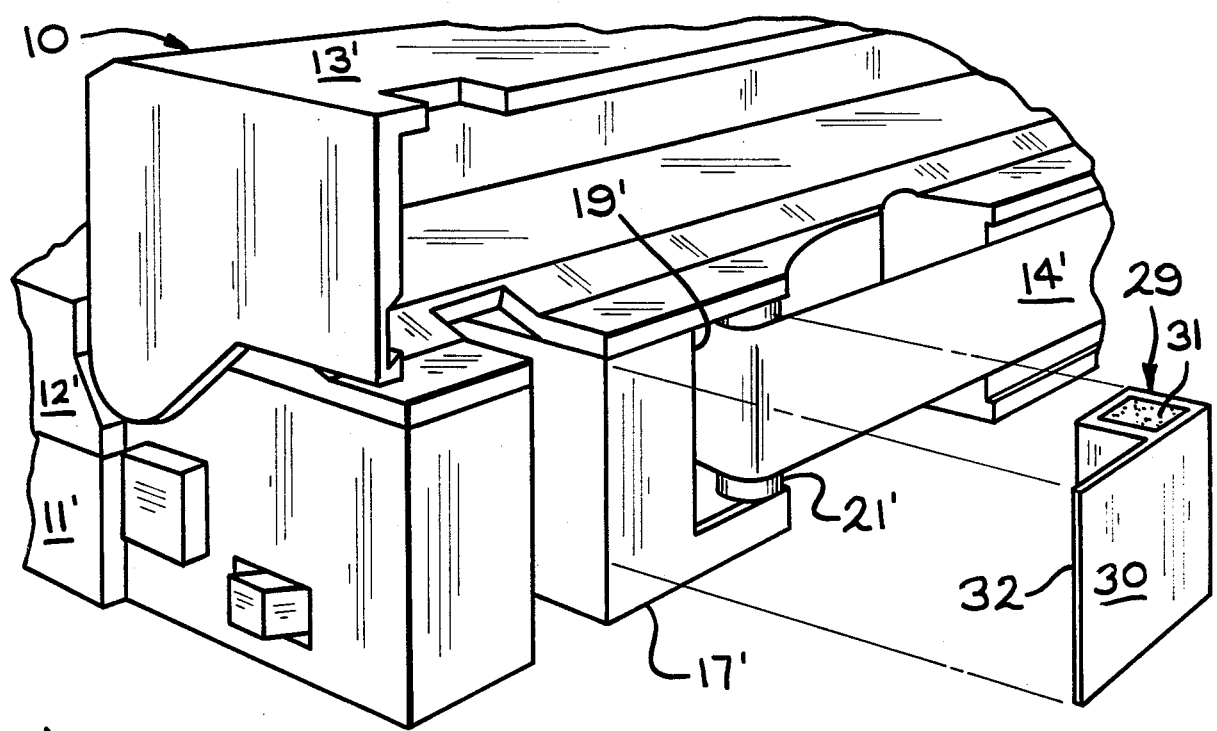
FIG. 4 is a fragmentary perspective view of another embodiment of a cassette, according to the present invention.

Referring to FIGS. 1–3, a cassette, according to the present invention, is generally indicated by the reference number 10. The cassette 10 has a base 11 and a top 12. A pivotal door 13 is mounted on the top 12.

As shown in FIG. 2, during playing of the cassette 10, the door 13 is pivoted upwardly to expose the tape 14. Referring to FIG. 3, a supply reel 16 is movably mounted within the base 11. As the tape 14 leaves the supply reel 16 it travels along the outside of a front wall 17 defined by the base 11 and top 12 of the cassette 10. The tape path has a portion 18 which is parallel to such front wall 17. The front wall 17 defines an opening 19 adjacent an idler roller 21. As the tape 14 leaves portion 18 of the tape path it passes around the idler roller 21 to a take-up reel 22 which is mounted for movement within the base 11. A magnet 24 is mounted on the front wall 17 adjacent the idler roller 21.

The magnet 24 is aligned in a horizontal orientation and preferably has a strength above 25,000 Joules/meter$^2$. It has been found that when the tape 14 passes next to the magnet 24 that the magnet 24 is very efficient in removing all video, audio and track control signals from the tape 14 thereby insuring one time play of the video tape production.

Figure 5:
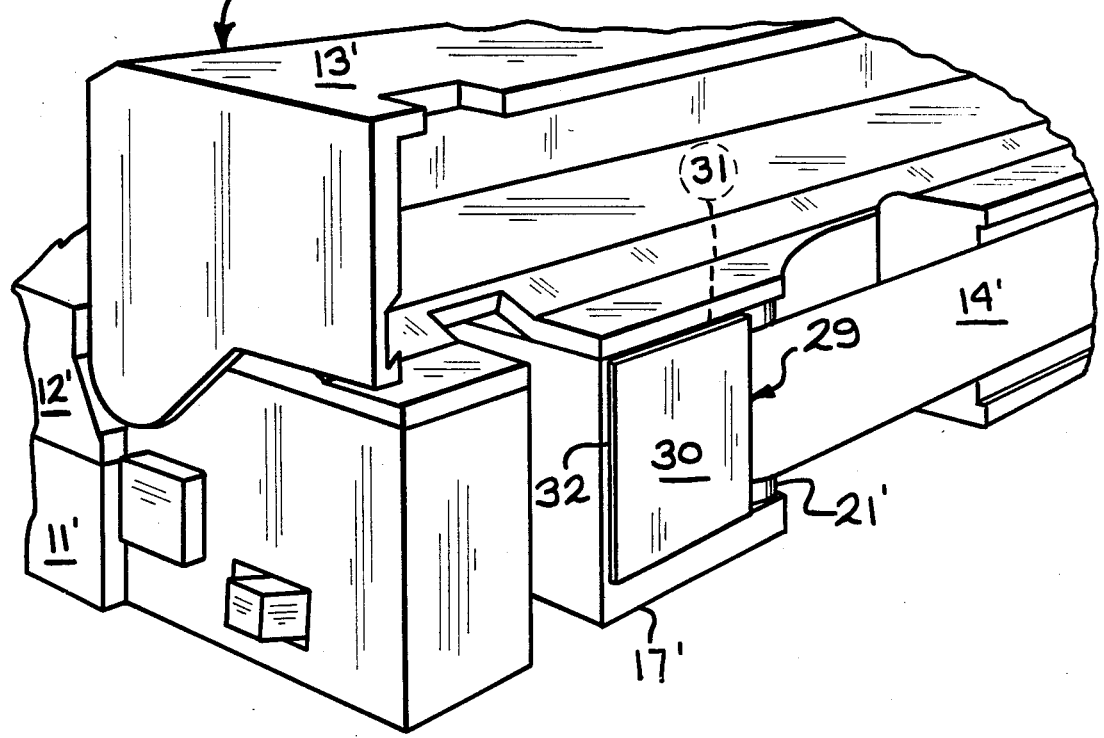
FIG. 5 is a view similar to FIG. 4 with the magnet housing mounted adjacent the front wall.

Referring to FIGS. 4 and 5, another embodiment of the present invention is shown. In this embodiment, the front wall 17' again defines an opening 19' adjacent the idler roller 21'. A magnet assembly 29 having a housing 30 and a magnet 31 is removably positioned, by adhesive or otherwise, adjacent the front wall 17'. The magnet portion 31 extends into the opening 19' while a leg 32 of the housing 30 overlies a portion of the front wall 17'. Again, the tape 14' passes closely adjacent the magnet 31 to erase all signals on the tape 14'.

In both the first and second embodiments, because the magnets 24 and 31 are mounted contiguous to the front wall 17 and 17', the magnets may be placed in position or removed for redubbing without disassembly or reassembly of the cassette.

Also, the magnets 24 and 31 do not make direct contact with the tape 14 and 14'. Because of the horizontal orientation of the magnets, direct contact of the tape is not required thereby reducing friction wear and damage to the tapes.

A third embodiment of the invention is shown in FIGS. 6, 7 and 8. A cassette housing 35 includes a top 36 and a base 37. The top 36 and base 37 define a front wall 38 and a pivotable door is indicated in FIG. 7 by the reference number 39. An opening 41 is defined in the front wall 38 adjacent an idler roller 42. Video tape 44 after it leaves the transducer head (not shown) passes the idler roller 42 and enters the opening 41 on its way to a take-up reel 43.

A post 46 extends upwardly from the base 37 and pivotally mounts a lever 47 having a magnet arm 48 and an operating arm 49. The lever 47 is spring-biased by a spring 50 to urge the magnet arm 48 and a magnet 52, mounted thereon, inwardly to a position adjacent the tape 44, as indicated in FIG. 6. Referring to FIG. 7, a second lever 54 having a lower arm 55 and an upper arm 56 is pivotally mounted on a shaft 57 which is horizontally positioned within the base 37.

Referring to FIG. 6, during a normal play of the cassette 35, as the tape 44 is wound upon the take-up reel 43, the magnet arm 48 and the magnet 52 are biased to an erase position adjacent the tape 44. This insures a one-time play of the tape and erases all audio, video and control signals. However, if it is desired to reuse the cartridge and redub the tape 44, a pin 60 (see FIG. 7) is inserted through an opening 61 in the base 37 of the cassette 35. The pin 60 engages the lower arm 55 of the second lever 54. This rotates the lever 54 on its shaft 57 and moves the upper arm 56 clockwise, as viewed in FIG. 7. The upper arm 56 engages the operating arm 49 of the first lever 47 and acting against the spring pressure generated by the spring 50, rotates the magnet arm 48 outwardly from the tape 44 to the redubbing position shown in FIG. 8. It has been found that this is an efficient method of allowing reuse of the cassette 35, without disassembly of the cassette 35.

A major advantage of the third embodiment is that the efficiency of the magnet to remove the tape signals does not depend on the amount of tape in the cassette.

It has been found that the erasing cassette, according to the present invention is a very economical means of accomplishing its intended purpose.

What I claim:

1. A cassette having a base, a top and a pivoting door adjacent the top, a supply reel and a take-up reel mounted for movement on said base, tape mounted on said supply reel and extending along a path to said take-up reel, such path including a portion extending along a front edge of said base and said top adjacent said door, said top and said base defining a front wall adjacent said path portion, said front wall defining an opening for receiving said video tape as it moves from said path portion to said take-up reel, a magnet assembly mounted on said front wall adjacent said opening, said magnet assembly comprising a magnet and a member extending outwardly from said magnet, said member being mounted on and overlying said front wall, whereby the signals on the tape are erased as the tape passes said magnet.

2. A cassette, according to claim 1, wherein said magnet is mounted by said front wall closely adjacent said opening, whereby disassembly of the cassette is not required to remove the magnet for redubbing.

3. A cassette, according to claim 1, wherein the tape is spaced from said magnet when the tape passes the magnet.

4. A cassette having a base, a top and a pivoting door adjacent the top, a supply reel and a take-up reel mounted for movement on said base, tape mounted on said supply reel and extending along a path to said take-up reel, such path including a portion extending along a front edge of said base and said top adjacent said door, said top and said base defining a front wall adjacent said path portion, said front wall defining an opening for receiving said video tape as it moves from said path portion to said take-up reel and a magnet assembly mounted on said front wall adjacent said opening, said magnet assembly comprising a housing which receives a magnet and a leg extending outwardly from said housing, said leg being mounted on said front wall, whereby the signals on the tape are erased as the tape passes said magnet.

5. A cassette having a base, a top and a pivoting door adjacent the top, a supply reel and a take-up reel mounted for movement on said base, tape mounted on said supply reel and extending along a path to said take-up reel, such path including a portion extending along a front edge of said base and said top adjacent said door, said top and said base defining a front wall adjacent said path portion, said front wall defining an opening for receiving said video tape as it moves from said path portion to said take-up reel, a spring biased arm pivotally mounted adjacent said front wall, a magnet mounted on said arm, wherein said magnet is adjacent said tape during normal play, and means for moving said magnet to an inactive position spaced from said tape.

6. A cassette having a base, a top and a pivoting door adjacent the top, a supply reel and a take-up reel mounted for movement on said base, tape mounted on said supply reel and extending along a path to said base and said top adjacent said door, said top and said base defining a front wall adjacent said path portion, said front wall defining an opening for receiving said video tape as it moves from said path portion to said take-up reel, a spring biased first lever pivotally mounted adjacent said front wall, said first lever having a magnet arm and an operating arm, a magnet mounted on said magnet arm, wherein said magnet is adjacent said tape during normal play, a second lever mounted on said base, said second lever engaging said operating arm to move said magnet to an inactive position spaced from said tape.

* * * * *